Nov. 28, 1939.　　　H. W. WILKINS　　　2,181,290
CAGE NUT WELDER
Filed June 26, 1936　　　5 Sheets-Sheet 1

INVENTOR.
Howard W. Wilkins.
BY
Harness, Dickey, Pierce & Hann.
ATTORNEYS.

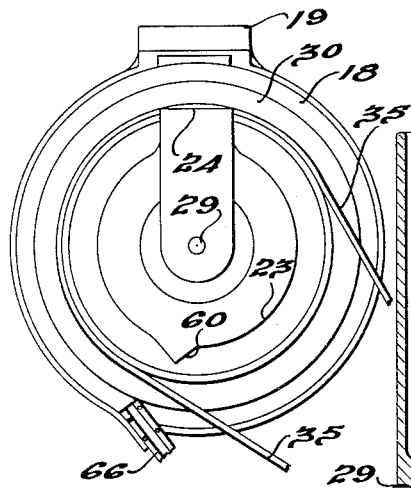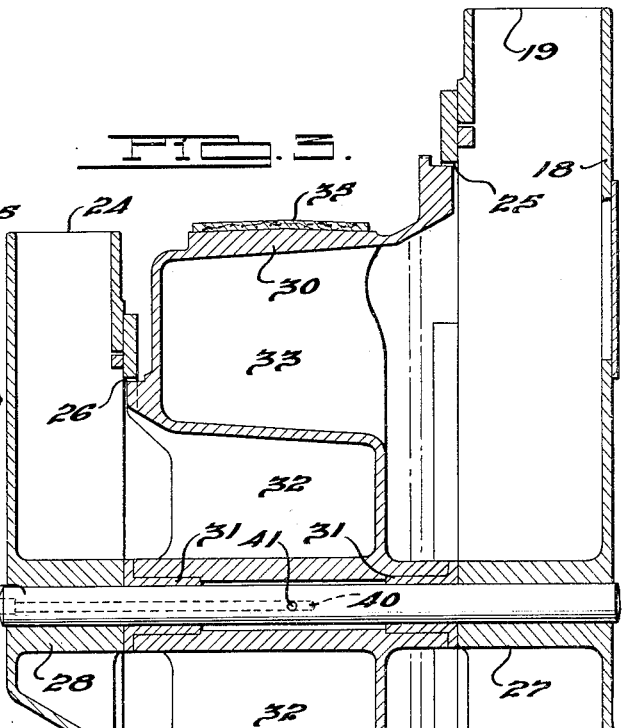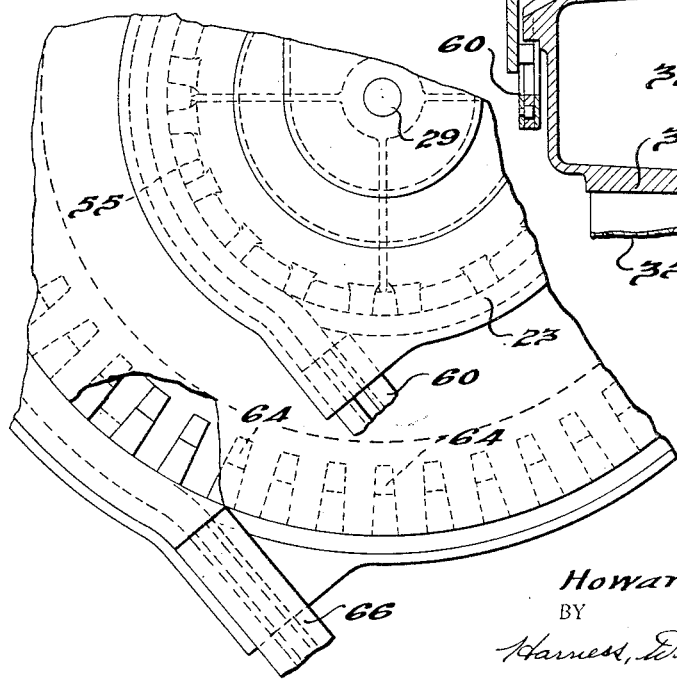

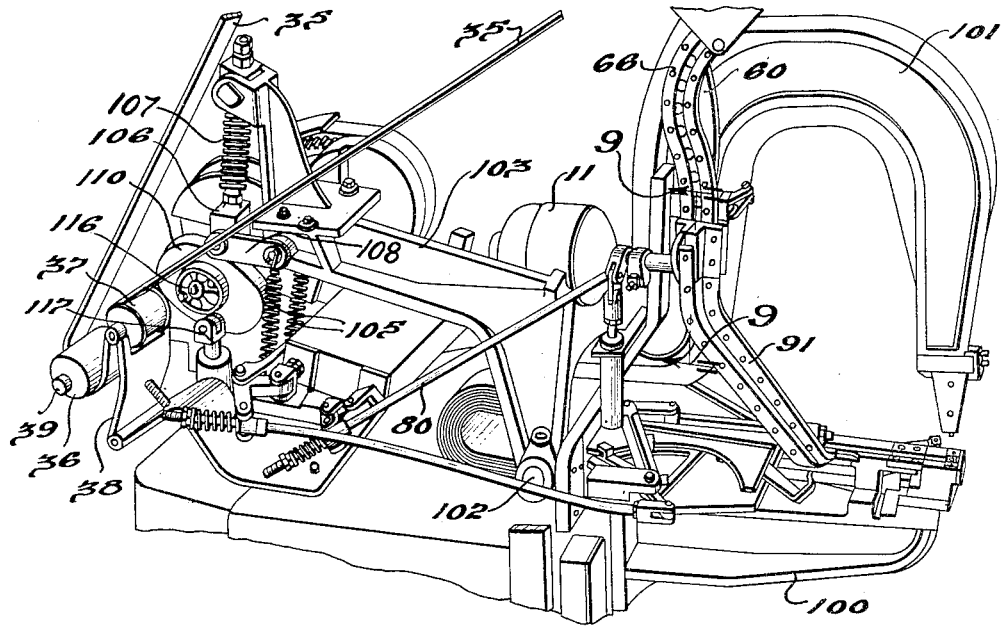

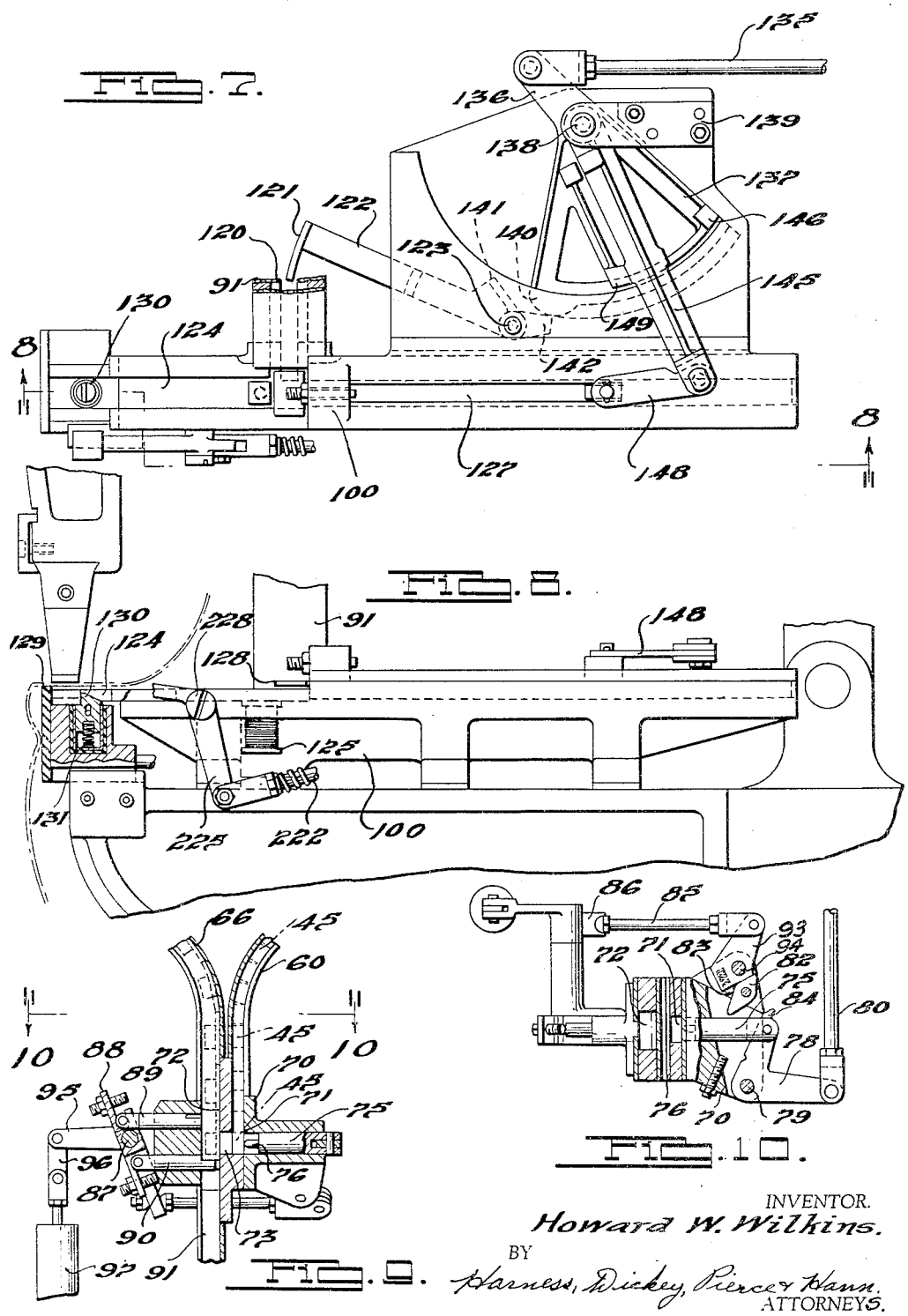

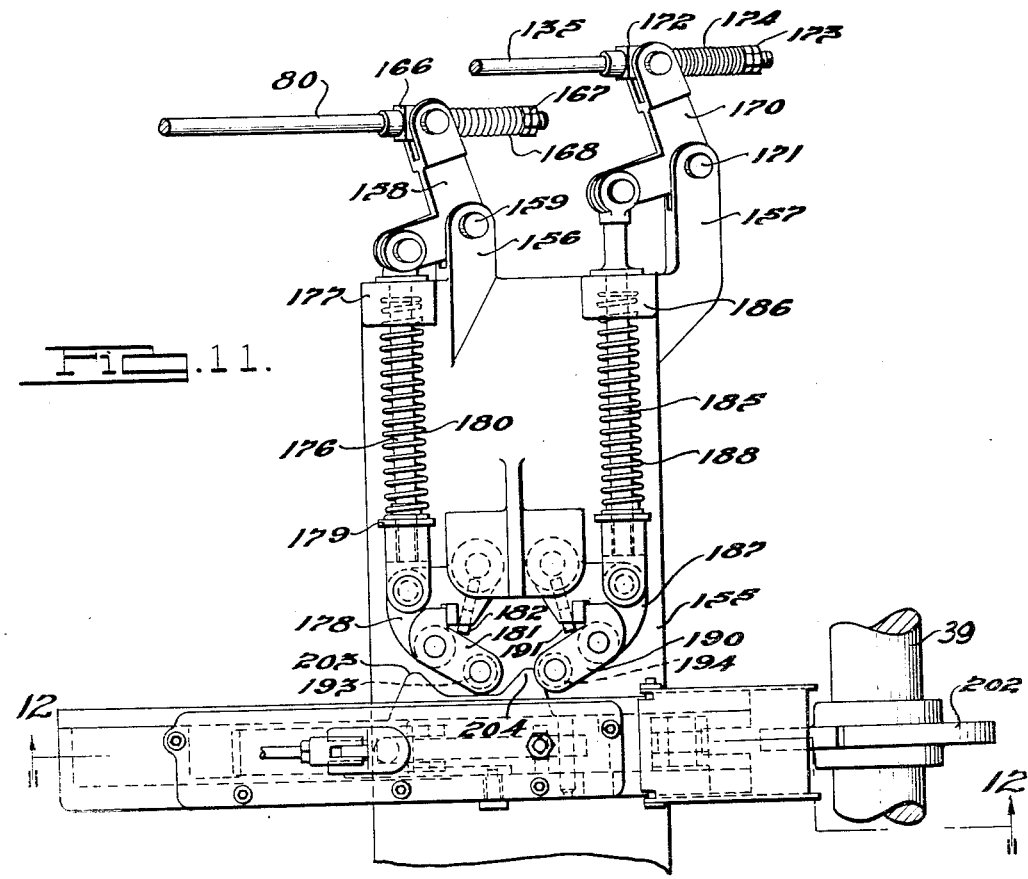
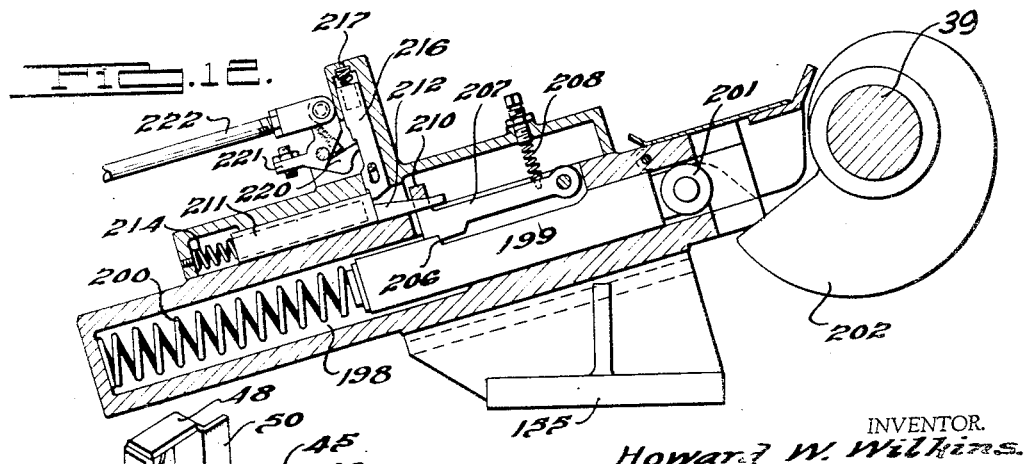

Patented Nov. 28, 1939

2,181,290

UNITED STATES PATENT OFFICE 2,181,290

CAGE NUT WELDER

Howard W. Wilkins, Warren, Mich., assignor to The Murray Corporation of America, a corporation of Delaware Application June 26, 1936, Serial No. 87,416

18 Claims. (Cl. 219—4)

This invention relates to a machine for automatically assembling a nut and a sheet metal retainer and feeding the same in position in a welding machine for a welding operation. More particularly, it relates to a machine which is substantially automatic in all features and serves to assemble in cooperative relation a nut and sheet metal retainer and automatically move said assembled nut and retainer in position between a pair of welding electrodes in order that same may be conveniently secured to a sheet metal member.

In order that members may be conveniently bolted to relatively light gauge sheet metal panels, it has been found particularly desirable to provide convenient means for mounting nuts rigidly with respect to the panels in order that a convenient threaded recess may be available for securing bolts, machine screws and other similar threaded members. While it will readily be appreciated that the features of the present invention will find broad and practical utility in many other fields, the specific apparatus disclosed herein is intended primarily for use in the fabrication of automobile bodies for the purpose of securely installing nuts in position with respect to sheet metal panels and mounting such nuts non-rotatably with respect to the panels with which they are associated.

The present invention contemplates the provision of a nut retainer which may consist of a sheet metal housing having a pocket or recess formed therein of a configuration adapted to receive a nut. The retainer is provided with a pair of laterally extending wings which are adapted to be spot welded to the surface of a panel in order that the nut held within the retainer will be completely enclosed and retained in a nonrotatable position with respect to the sheet metal panels to which the retainer is secured.

The present invention contemplates the provision of a machine in which the nuts and the retainers may be fed into separate hoppers and automatically assembled with one nut located in the recess of each retainer. The assembled retainer and nut is fed down through a suitable duct or feed passage to a position adjacent the point where the welding operation takes place. Automatic means are provided so that when a section or panel on which it is desired to mount a nut and retainer, is placed between the electrodes provided and the electrodes engaged, the machine will automatically be actuated to assemble a nut and retainer for a subsequent welding operation. A foot pedal is provided which, when compressed, will cause a relative movement of the electrodes in order to effect a welding operation of the nut and retainer to the panel, permanently mounting the nut in position with respect thereto. Upon releasing the mechanism and withdrawal of the panel from between the electrodes the mechanism is automatically set into operation to feed an additional nut and retainer in position for the next welding operation.

The machine of the present invention includes many important and distinctive features. One particularly important feature is the novel mechanism by which the nut and retainer are assembled in order that a positive effective assembly operation may be obtained.

Yet another object of the present invention consists in the provision of automatic mechanism for precluding the feed of assembled nuts and retainers toward the welding electrodes until the welding operation has been fully completed and the panel being welded displaced.

Still another important object of the invention consists in the provision of apparatus of this general character which is relatively simple and positive in operation and in which the working parts are easily accessible for repair and adjustment.

Still another important feature of the invention consists in the provision of an actuating lever located closely adjacent the welding electrodes, which operating lever is automatically displaced by the positioning of a panel between the electrodes. Means are provided whereby upon release of this actuating lever by displacement of the panel, the feeding of a second assembled nut and retainer into welding position is automatically accomplished.

Many other objects, advantages and features of novelty will become more clearly apparent from the following specification when considered in connection with the accompanying drawings forming a part thereof.

In the drawings:

Fig. 2 is an enlarged fragmentary side elevational view illustrating the opposite side of the hopper from the side shown in Fig. 1;

Fig. 3 is an enlarged fragmentary vertical sectional view through the hopper taken substantially on the line 3—3 of Fig. 1 illustrating the internal construction and arrangement of parts;

Fig. 4 is a fragmentary interior view of the hopper illustrating the various fingers utilized for the purpose of separately selecting nuts and retainers to be assembled.

Fig. 5 is an enlarged perspective view of the vertical central portion of the machine shown in Fig. 1 illustrating in greater detail the feed and assembly mechanism and automatic controls thereof;

Fig. 6 is an enlarged fragmentary perspective view similar to Fig. 5 illustrating the opposite side of that portion of the machine shown in Fig. 5;

Fig. 7 is an enlarged transverse sectional view taken substantially on the line 7—7 of Fig. 6 illustrating in plan the mechanism for feeding the assembled nut and retainer out into welding position;

Fig. 8 is a vertical sectional view taken substantially on the line 8—8 of Fig. 7 illustrating in detail the nut feeding and control mechanism and the manner in which the nuts are retained in position during the welding operation;

Fig. 9 is an enlarged vertical sectional view taken substantially on the line 9—9 of Fig. 5 illustrating in detail the mechanism provided for assembling the nuts in cooperative relation with respect to their retainers;

Fig. 10 is an enlarged sectional view taken substantially on the line 10—10 of Fig. 9 illustrating in detail the mechanism provided for the assembly of the nuts and retainers;

Fig. 11 is an enlarged fragmentary plan view taken substantially on the line 11—11 of Fig. 6 illustrating in detail the automatic actuating mechanism for feeding the nut and retainer into welding position.

Fig. 12 is a vertical sectional view taken substantially on the line 12—12 of Fig. 11 illustrating in greater detail the operating mechanism shown therein; and Fig. 13 is an enlarged exploded perspective view of a nut and retainer of the type particularly adaptable for use in connection with the machinery shown in the preceding figures.

Figure 1:
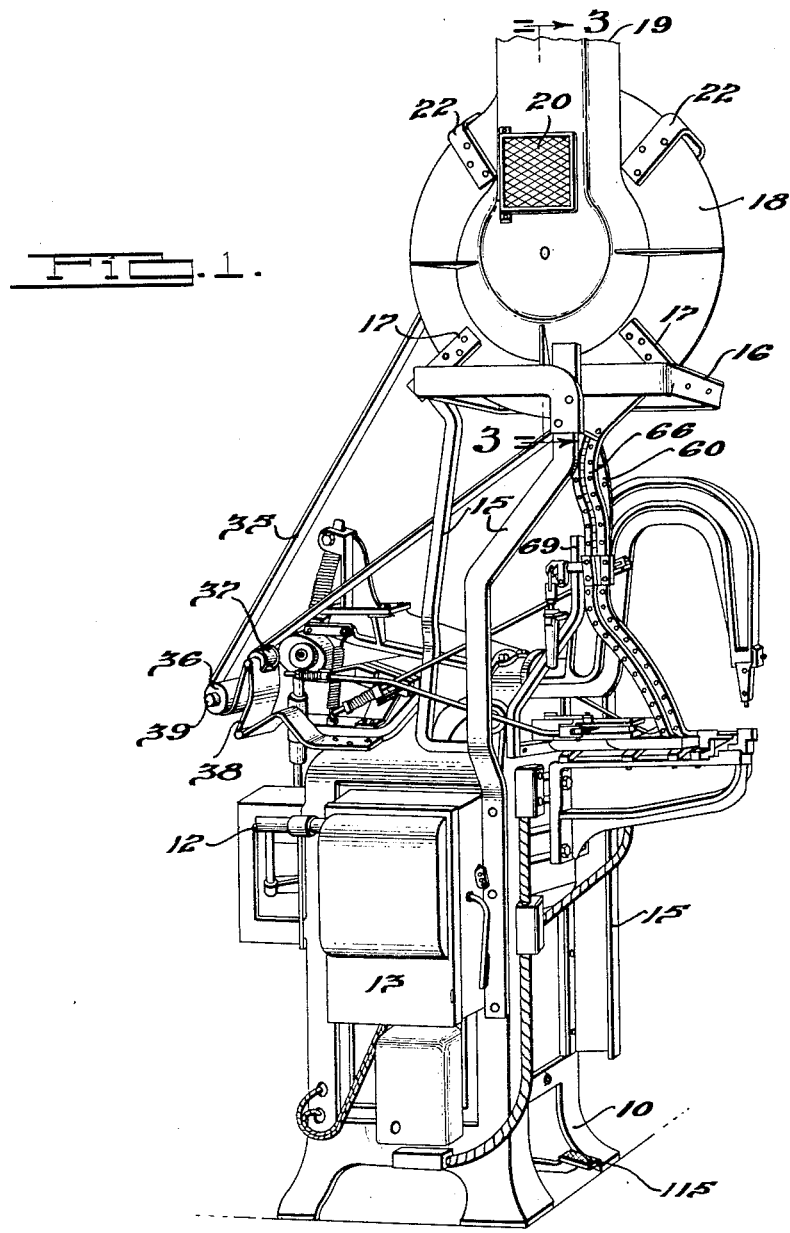
Figure 1 is a perspective view of the completely assembled machine illustrating the same in a position ready for operation.

With more particular reference to the drawings, the specific embodiment of the invention disclosed therein includes a base 10. The base 10 has mounted on the upper surface thereof an actuating motor 11 which serves to provide means for driving the mechanism hereinafter described in detail. Current for driving the electric motor, as well as for actuating the welding electrodes hereinafter described in detail, is supplied to the apparatus through a conduit 12 which communicates with a housing 13 secured to the side of the base frame 10. As is conventional in constructions of this general character, the housing 13 may enclose the conventional circuit breakers and power control mechanism and house the main switch for setting the machine into operation.

A plurality of brace members 15 are secured in their lower ends to the base frame 10 and extend upwardly, serving to rigidly support a generally rectangular framework 16. The rectangular framework 16 has secured thereto a pair of upwardly extending braces 17 which serve to support a stationary, substantially circular hopper 18 which has an opening 19 in its upper end and is provided in its face with a door 20 in order that convenient access may be had to the interior thereof.

A pair of brace brackets 22 are permanently secured to the upper portion of the hopper 18 and serve to support in spaced relation with respect thereto a second hopper 23. The hopper 23 is open at its upper end 24 in order that parts to be assembled may be conveniently fed thereinto. The lower side of the hopper 23 may be conveniently supported on the rectangular framework 16 by suitable braces such as may be desired. From the foregoing it will be appreciated that the two hoppers 18 and 23 are supported rigidly with respect to each other and maintained in predetermined substantially spaced relation.

The adjacent faces of the hopper 23 are provided with openings 25 and 26 therein, said openings being substantially coaxially disposed with respect to each other. The housings 18 and 23 are each preferably formed in their axial central portions with integral projections 27 and 28 which serve to provide means for mounting a shaft 29 which serves to interconnect the two hoppers and which is arranged coaxially with the openings 25 and 26 in the adjacent faces of the hoppers. A substantially circular rotatable housing member 30 is journaled for rotation on the shaft 29 and disposed between the hoppers 18 and 23. The rotatable member 30 is provided with suitable bearings 31 which closely fit the shaft 29 and which serve to mount the member in freely rotatable position and at the same time preclude axial movement thereof with respect to the shaft 29 and hoppers 18 and 23. The rotatable member 30 is preformed to provide a pair of separate, coaxially arranged, annular chambers 32 and 33, the chamber 33 opening into the hopper 18 and the chamber 32 opening into the hopper 23. The member 30 is provided with a substantially cylindrical peripheral surface 34 over which passes a belt 35 for the purpose of rotatably driving the member 30. The opposite end of the belt 35 passes over a relatively small pulley 36 and is maintained tensioned by means of an idle pulley 37 mounted on a suitable spring pressed, pivotally mounted arm 38 in order to maintain the belt properly tensioned at all times. The drive pulley 36 is secured to a shaft 39 which, as will hereinafter be more clearly seen, is driven by means of the motor 11 and serves to effect periodic rotation of the chamber 30 as will hereinafter be more clearly seen.

The shaft 29 may be provided with a suitable axial lubricating bore 40 which communicates by means of a lateral duct 41 with the axial central portion of the shaft in order to supply lubricant to the bearing 31 which serves to journal the housing 30 on the shaft. Lubricants may be supplied to the axial duct 40 by means of a suitable conventional lubricant fitting 42 threadably received in the axial end of the shaft 29, and easily accessible.

In Fig. 13 is illustrated a nut and retainer of the type particularly adaptable for use in connection with the present machine. By reference to this figure it will be appreciated that a square nut 45 is used which is substantially symmetrical in configuration and has in the central portion thereof an internally threaded bore 46. The retainers 48 utilized in connection with these nuts comprise a sheet metal member bent to provide a hollow, square recess 49 of a configuration adapted to receive the nut 46 and which is sufficiently deep so that when the nut is seated within the recess the surface of the nut will not extend beyond the walls of the recess.

The retainer 48 is bent to provide laterally projecting wing portions 50 from two of the opposite sides thereof. It will be readily appreciated that the specific nut per se and the specific retainer per se are not material parts of the present invention and the shape and structure thereof may be materially modified. Further it will be appreciated that in the event different types of nuts and retainers are used, very slight modification of the apparatus described herein will be required to accommodate them.

The housing member 30 adjacent the mouth of the annual chamber 32 is provided with a plurality of spaced axially projecting fingers or vanes 55. These vanes have spaces therebetween slightly wider than the width of the nut 45. It will be clear that as a plurality of nuts 45 are dropped into the hopper 23 through the open upper end 24 thereof these nuts will descend into the annual chamber 32 and, as the chamber 32 is rotated, certain of these nuts will inherently, by gravity, seat themselves between the fingers or vanes 55 and will consequently be automatically fed downwardly into a chute 60. The chute 60 is preferably formed of sheet metal or similar material and is rectangular in cross-sectional configuration in order to maintain the nuts edge to edge one upon the other in predetermined relation.

The retainer members 48 are fed in quantity into the hopper 18 through the open upper end 19 thereof and it is seen that these retainers will automatically descend into the annual chamber 33 in the rotatable housing 30. The housing 30 is provided adjacent the mouth of the chamber 33 with a plurality of spaced fingers or vanes 64 which are sufficiently close together so that the retainers 48 will be admitted therebetween only in the event that they are in a predetermined position. Due to the ears 50 disposed upon each of two opposite sides of the retainer members 48, it will be appreciated that these retainers are considerably longer than they are wide. Consequently, the fingers 64 are spaced apart sufficiently to accommodate the retainers only if they enter the space between the fingers longitudinally. A chute 66 communicates with the lower side of the hopper 18 so that certain of the retainers which enter between the fingers 64 may fall into the chute. As will hereinafter be more clearly appreciated, it is essential that the retainers descending into the chute 66 not only be arranged upon a predetermined axis, but also have the wing portions thereof adjacent the left-hand side of the chute, as viewed in Fig. 3. In order to insure the proper positioning of the retainers within the chute 66, an annular bead or raised projection 67 is formed on the hopper 18 adapted to cooperate with the fingers 64 in such a way that the retainers entering between the fingers 64 will not be permitted to enter the chute 66 unless they are located right side up. It will be appreciated, by reference to the lower right-hand portion of Fig. 3, that the annular bead 67 provides, in cooperation with the rotatable housing 30 and the hopper 18, a duct having a relatively sharp turn therein, and it will be appreciated that if the retainers lying between the fingers 64 have the wing portions thereof adjacent the surface of the housing on which they rest, there will be sufficient clearance for these retainers to turn the corner in the duct 68 and descend into the chute 66. In the event that the retainers are located between the fingers 64 wrong side up, they will be carried upon rotation of the housing 30 adjacent the upper portion thereof where they will drop out by force of gravity and at random subsequently enter between a pair of the fingers 64. From the foregoing, it will be appreciated that only the retainer members which are faced the right way are permitted to descend into the chute 66 and those which are faced the wrong way will be automatically carried past the mouth of the chute and subsequently fall out from between the fingers 64 by gravity when they reach the upper position.

As will appear more clearly hereafter, the shaft 39 which serves to rotate the housing 30 by means of the belt 35 is constantly driven, and, hence, the housing 30 is constantly driven. The assembled nuts and retainers are, however, used intermittently as welding operations take place and, consequently, the chute 60 will be constantly maintained full of nuts and the chute 66 will be constantly maintained full of retainers. The chutes are tangentially disposed with respect to their respective hoppers and with respect to the rotating housing 30 so that when the chutes have been filled, nuts and retainers will be carried past the mouths thereof without dropping thereinto.

The apparatus for assembling the nuts in cooperative relation with their respective retainers is illustrated in detail in the sectional views, Figs. 9 and 10. By reference to these views, it will be apparent that the ducts 60 and 66 descend downwardly and are brought into side by side relation and both are connected to a housing 70. This housing is preferably a casting and is permanently supported on the base frame 10 a substantial distance thereabove by means of a bracket 69. The housing 70 is provided with a duct 71 which is of cross-sectional configuration such that it will constitute a substantial continuation of the duct 60 and likewise with a duct 72 which constitutes a substantial continuation of the duct 66. A transverse passageway 73 provides communication between the duct 71 and the duct 72 and this passageway 73 is of a cross-sectional configuration adapted to closely surround the peripheral edge of the nuts 45. A plunger 75 is mounted in a suitable bore coaxially disposed with respect to the passageway 73 and this plunger 75 has a finger 76 on the axial end thereof adapted to enter the threaded bore of a nut and maintain the same in predetermined position with respect to the plunger. A bell crank 78 is pivotally mounted on a pin 79 supported by the housing 70 and one arm of this bell crank is pivotally connected to the bifurcated outer end of the plunger 75. This pivotal connection permits reciprocation of the plunger 75 in its bore to be effected by pivotal movement of the bell crank 78 about its pivot 79. The other arm of the bell crank 78 has pivotally connected thereto an operating rod 80 adapted to be periodically actuated by means hereinafter described in detail. It will be clear from the foregoing that when tension is applied to the rod 80, pivotal movement of the bell crank 78 will take place, causing the plunger 75 to move axially in its bore, causing the finger 76 on the end thereof to enter the threaded bore of a nut which has descended through the duct 66 and duct 71 into position in front of the plunger. It will be appreciated that the duct 71 terminates in front of the plunger in order that as a nut descends in this duct it will automatically be stopped in a position whereby it can conveniently be engaged by the plunger 75.

Means are provided for periodically and cooperatively feeding the retainers 48 into such a position within the housing 70 that when actuation of the plunger 75 takes place, the nut 45 engaged by the plunger will be forced thereby into the recess 49 of a retainer disposed in the duct 75

72 with the recess thereof opening into the transverse passageway 73.

In order to accomplish this periodic synchronous feed of the retainers, a bell crank arm 93 is pivotally mounted on a suitable pin 94 on the housing 70. This bell crank arm 93 has pivotally mounted on one end thereof a latch member 82 which is urged into projecting position by means of a spring pressed pin 83. This pivotally mounted latch member 82 is adapted to engage a projecting cooperating latch 84 extending from the end of the bell crank arm 78. It will be clear by reference to Fig. 10 that as pivotal movement of the bell crank arm 78 takes place, the plunger 75 will move forward and the projecting latch 84 will be permitted to slip past the pivotally mounted latch 82. However, upon the return of the plunger 75 to the position shown in Fig. 10, the latch 84 will engage the underside of the latch member 82, effecting a pivotal movement of the bell crank arm 93 about its pivot 94. The opposite end of the bell crank 93 has an actuating rod 85 pivotally connected thereto, which rod is connected to a crank arm 86 on a transversely extending shaft 87. The shaft 87 is rotatably journaled in a bore through a portion of the housing 70 and carries at its opposite end a cross arm 88. This cross arm 88 has pivotally mounted in suitable recesses therein a pair of plungers 89 and 90 operating in suitable bores in the housing 70. It will be appreciated that as the shaft 87 is partially rotated by movement of the operating arm 85, one of the plungers 89 and 90 will move inwardly and the other plunger will move outwardly. The lower plunger 90 extends through a suitable bore in the housing 70 into a duct 91 which constitutes a continuation of the duct 72. This plunger 90 serves to hold the retainers in position so that nuts may be inserted in the recesses thereof by means of the plunger 75. In other words, the plunger 90 constitutes a limit stop to prevent downward movement of the retainer members during the time the nuts 45 are being inserted thereinto. The upper plunger 89 serves to enter the space between two adjacent retainers and permits the lowermost of said retainers to drop down the duct 91 after the nut has been inserted thereinto and prevent the next adjacent retainer from also dropping down this duct.

The shaft 87 is provided with an additional crank arm 95 which, by means of a suitable link 96, is connected to a dashpot 97 which insures a relatively slow and deliberate operation of the retainer holding mechanism described above.

From the foregoing it will be appreciated that the ducts 66 and 60 are supplied with retainers and nuts, respectively, by the hopper mechanism described above. The nuts and retainers descend in these ducts by gravity and enter the housing 70. The lowermost nut 45 will lie opposite the transverse duct 73 and the lowermost retainer member will be prevented from further downward movement by the limit stop plunger 90 and will be retained in such a position that the recess of the retainer is positioned exactly opposite the transverse passageway 73. When the actuating rod 80 is pulled, the bell crank 78 will be swung around its pivot causing a forward movement of the plunger 75 in its bore. The finger 76 on the end of this plunger will enter the threaded bore of the nut 45 lowermost in the duct and move this nut through the transverse passageway 73 and position the nut within the recess 49 of the lowermost retainer. Upon a completion of this movement, the plunger will be returned outwardly by the operating rod 80 as hereinafter described in detail, and during its outward movement the catch 84 on the end of the bell crank arm 78 will engage the pivotally mounted latch 82 and cause a pivotal movement of the bell crank 80 about its pivot 81. The pivotal movement of the bell crank 80 will cause a movement of the operating rod 85 and a consequent partial rotation of the shaft 87 causing the plunger 89 to move inwardly and the plunger 90 to move outwardly. The inward movement of the plunger 89 will serve to prevent any of the retainers except the lowermost one from moving down through the housing 70 and the outward movement of the plunger 90 will serve to permit the lowermost retainer with its nut housed therein to drop downwardly into the duct 91. As the dashpot 97 permits these plungers to return to the positions shown in Fig. 9, it will be appreciated that the bottom plunger 90 will again move inwardly to a point where it will block downward movement of the retainers in the duct 66 and the outward movement of the plunger 89 will permit the retainers in the duct 66 to descend until the lowermost retainer comes into contact with the plunger 90. In this way it will be seen that a reciprocation of the operating rod 80 serves automatically to assemble a nut within the recess of its retainer and permit the assembled nut and retainer to drop downwardly by gravity through the duct 91.

The manner in which the assembled nut and retainer are fed into position for welding will be described in detail below. It is noted that the duct 91 carries a supply of assembled nuts and retainers into a position adjacent the welding electrodes of the machine.

The welding electrodes of the machine and the general structure of the welder as a whole are substantially conventional and will be described only in sufficient detail to make the novel features of the present invention perfectly clear. The lower electrodes of the welding apparatus are carried by a rigidly mounted outwardly projecting arm 100 securely bolted to and forming an integral part of the base frame 10. A U-shaped upper arm 101 is pivotally mounted upon an axis 102 and it has formed integrally therewith a rearwardly extending portion 103 which serves to provide means for effecting physical movement of the welding arm 101 about its pivot 102 in order to bring the electrodes at the lower ends thereof into engagement with the electrodes carried by the stationary arm 100. The electrodes carried by the arm 101 are normally maintained in disengaged position by means of the tension coil springs 105 which serve to bring the rear portion 103 of the arm downwardly and consequently raise the U-shaped portion 101 carrying the electrodes upwardly. A cam follower block 106 is resiliently mounted by means of a compression coil spring 107 at the rear of the portion 103 of the pivotally mounted welding arm. This block 106 may accurately be retained in position by means of a pair of pivotal links 108.

In order to effect positive action of the welding arm 101 and to effect a predetermined resilient engagement of the electrodes carried thereby with the lower electrodes carried by the arm 100, a rotatable cam member 110 is provided, which cam member cooperates with the follower block 106. The cam member 110 is of a configuration such that one revolution thereof will serve to effect a positive engagement and subsequent disengagement of the electrodes carried by the arms 100 and 101, the spring 107 serving to contribute some necessary and desirable resiliency to the engagement thus effected.

The cam member 110 is carried upon the shaft 39 which is connected to a suitable clutch mechanism 112 to the opposite side of which is connected the electric motor 11 by means of suitable gearing. As is conventional in constructions of this general character, a foot pedal 115 is provided in the lower front portion of the machine, which foot pedal is connected by means of suitable linkage (not shown) with the clutch 112 in order to effect engagement thereof as may be desired. It will be appreciated that when the motor 11 is running continuously, the foot pedal 115 may be depressed causing an engagement of the clutch mechanism 112 and consequent rotation of the shaft 39 and hence a rotation of the cam member 110 serving to bring the welding electrodes into engagement with each other. As is conventional in constructions of this kind, a second cam member 116 is also secured to the shaft 39, this cam member serving to operate a plunger 117 which serves to control a plunger-type switch for the purpose of turning on and off the welding current, which switch may be of conventional construction and arranged to time the flow of current in order that a satisfactory spot weld may be provided. As has been explained above, this apparatus forms no part of the present invention and is merely illustrated and described in order to clarify the general disclosure.

The apparatus for feeding the assembled nuts and retainers into welding position is actuated by the following mechanism. By reference to Figs. 5, 6, 7 and 8, it will be clear that the duct 91 which serves to feed these assembled nuts and retainers is curved to lie substantially in a horizontal plane at the point where it joins the lower welding arm 100. The duct 91 is provided with a slot 120 in its underside at this point. The slot 120 is of sufficient width to admit an actuating finger 121 forming an integral part of a feeding arm 122, which feeding arm is pivotally mounted at the point 123. This finger 121 serves to feed nuts from the duct 91 into a channelway 124 extending longitudinally of the lower arm 100 of the welder. The channelway 124 is of a cross-sectional configuration adapted to receive the retainer housing of the nut with the wing portions 50 thereof extending out over the sides of the channelway. A suitable electromagnet 125 is mounted in a recess underneath the junction of the duct 91 and channelway 124 in order to retain the nuts and retainers in position at this point until they are moved outwardly to welding position. This electromagnet is preferably constantly energized in order that the nut and retainer in assembled position will remain in predetermined position until forced outwardly in the channelway, as hereinafter described in detail.

A plunger 127 operating in suitable guides formed in the arm 100 serves to provide means for moving the nuts outwardly in the channelway 124 to the outer end of the arm in position for welding. The plunger 127 has at its forward end a flat finger 128 which is adapted to slip over the top of the nut in order to retain the nut and retainer in assembled relation as it moves outwardly in the channelway 124. The channel 124 is provided with a limit stop member 129 at its outer end. Spaced from the outer end of the channelway and recessed in the bottom thereof is a spring pressed catch 130 which is constantly urged upwardly by means of a compression coil spring 131. It will be readily appreciated that, as the plunger 127 moves the assembled nut and retainer outwardly in the channel 124, the catch will be depressed and the nut and retainer will slide over the depressed catch. As the plunger 127 returns to the position shown in Figs. 7 and 8, the catch 130 will rise up and retain the assembled nut and retainer in welding position at the outer ends of the arm 100 with the wing portion thereof overlying the electrodes at the outer end of the arm.

This mechanism for feeding the assembled nut and retainer into welding position is actuated by an operating rod 135 which is pivotally connected to a projection 136 formed as an integral part of a quadrant 137 which is pivotally connected to the framework at the point 138. The lower end of the pivotal mounting 138 may be supported in the framework and at the upper end thereof is preferably supported by means of a suitable bracket 139 permanently secured to the framework.

The quadrant 137 is provided with a cam projection 140 on the peripheral surface thereof which, upon arcuate movement, is adapted to engage a cooperating cam face 141 formed on the projecting end of the arm 122. It will be apparent, by reference to Fig. 7, that an interengagement of these cam surfaces serves to cause arcuate movement of the arm 122. These cam members 140 and 141 are preferably so constructed and arranged that arcuate movement of the quadrant 137 serves to cause a pivotal movement of the arm 122 about its pivot 123 causing the finger 121 on the end of this arm to enter the slot 120 in the lower side of the duct 91 and force an assembled nut and retainer into position over the electromagnet 125 in the channelway 124, placing the assembled nut and retainer directly in front of the plunger 127. It will be further appreciated that the cam surface 140 is so formed that relatively little arcuate movement of the quadrant 137 will be required to complete this entire movement.

The arm 122 is provided with a portion 142 projecting beyond the pivot 123 which, upon movement of the quadrant in the opposite direction, serves to engage the cam 140 and return the arm 122 to its original position.

An auxiliary arm 145 is pivotally connected at the point 138 coaxially with the quadrant section 137. This arm 145 extends outwardly beyond the quadrant section 137 and within a limited range is movable independently thereof. The quadrant section is provided with a projecting lug 146 which is adapted to engage the side of the arm and effect positive movement thereof about its pivot after a predetermined movement of the quadrant section has taken place. This lug 146 is preferably so positioned that it will not engage the arm 145 until after the interengagement of the cam surfaces 140 and 141 has been completed. The outer end of the arm 145 is connected by means of a pivotal link 148 to the rear end of the plunger 127. Consequently it will be appreciated that, as the quadrant is moved about its pivot, the lug 146 will engage the side of the arm 145 and cause a forward movement of the plunger 127 in the channelway 124. It will also be apparent due to the construction and arrangement of the quadrant section and the cam surfaces 140 and 141, that no movement of the plunger will take place until the arm 122 has completed its stroke, placing an assembled nut and retainer in position in front of the forward end of the plunger 127. The quadrant section is also provided with a lug 149 adapted to engage the opposite side of the arm 145 to effect a retraction of the plunger 127 in its channelway 124 as will be explained in greater detail hereinafter.

From the foregoing it will be appreciated that, as tension is applied to the operating rod 135, a pivotal movement of the quadrant section 137 will take place about its pivot 138. The first stage of this movement serves to cause an interengagement of the cam surfaces 140 and 141 and cause a pivotal movement of the arm 122 about its pivot 123. As has been explained above, this pivotal movement serves to cause the finger 121 to enter the slot 120 and move an assembled nut and retainer into position engaging the forward end of the plunger 127. After this movement has been completed, the lug 146 will engage the side of the arm 145 and effect an operative engagement between these parts, causing a forward movement of the plunger 127 in its slot 124, as the movement of the operating rod 135 and consequent movement of the quadrant 137 is continued. This movement of the operating rod continues until the nut and retainer have been moved outwardly to a point where they abut against the stop member 129 at the outer end of the arm 100. Upon retraction of the arm 127, the catch 130 will spring up retaining the assembled nut and retainer in welding position at the outer end of the arm 100 and the parts will be returned to substantially the position shown in Figs. 7 and 8.

A single mechanism is provided for simultaneously actuating both the nut assembly mechanism operated by the rod 80 and the mechanism for feeding the assembled nuts and retainers into welding position operated by the rod 135. This apparatus is illustrated in the detail views, Figs. 11 and 12. By reference to these figures, it will be seen that a base framework 155 is provided, which framework is adapted to be rigidly secured to the base 10 of the machine as a whole at a point adjacent the shaft 111. This base member 155 is provided at one end with a pair of spaced bifurcated projections 156 and 157. The bifurcated projection 156 serves to pivotally support a bell crank arm 158 by means of a pivot pin 159. The outer end of the bell crank arm 158 has a block 166 pivotally mounted therein, which block has a bore through which the operating rod 80 passes. The operating rod 80 extends a substantial distance through this arm and has a pair of nuts 167 locked on its extreme outer end. A compression coil spring 168 is confined between the nuts 167 and the block 166 in order that, as pivotal movement of the bell crank arm 158 takes place, the spring will tend to transmit this movement resiliently to the arm 80. A bell crank arm 170 is likewise mounted in the bifurcated end of the projection 157 by means of a pin 171 and likewise its outer end is bifurcated and pivotally supports a block 172 through which the operating rod 135 passes. The extreme end of the operating rod 135 is provided with a pair of nuts 173 which serve to confine a compression coil spring 174 between these nuts and the block 172, thus providing a similar resilient lost motion connection between the bell crank 170 and the arm 135. The opposite arm of the bell crank 158 is connected to a rod 176 mounted for reciprocation in a suitable guiding lug 177 which may be formed integrally with the base member 155 and pivotally connected at its opposite end to a pivotally mounted bracket 178. The rod 176 is provided with a collar 179 which serves to confine a compression coil spring 180 between this collar and the lug 177. This coil spring 180 serves to return the rod 176 and bell crank 158 to normal position after actuation, as will hereinafter be more clearly seen.

A link 181 is pivotally connected to the bracket 178 and is constantly urged outwardly by means of a spring pressed plunger 182 mounted in a suitable recess in the bracket 178. The bell crank arm 170 likewise has its opposite end pivotally connected to a push rod 185 passing through a suitable lug 186 formed as an integral part of the base frame 155. This rod is likewise pivoted at its opposite end to a pivotally mounted bracket 187 and has surrounding it a compression coil spring 188 which serves to return the bell crank 170 to normal position. A link 190 is pivotally connected to the bracket 187 and is constantly urged outwardly by means of a spring pressed plunger 191. The links 181 and 190 have mounted in their ends rollers 193 and 194, respectively, which rollers serve to cooperate with a double cam member, hereinafter described in detail.

The base member 155 is formed to provide a hollow, substantially cylindrical bore 198 therein which serves to house a plunger member 199, which plunger member is constantly urged to the rear of this bore by means of a relatively strong compression coil spring 200. The rear end of the plunger 199 is bifurcated and has freely journaled therein a roller 201 which is adapted to engage the peripheral surface of a spiral cam 202 rigidly secured to the shaft 111. It will be seen that the cam member 202 is of such a configuration that it tends to urge the plunger member 199 forwardly a substantial distance in the bore 198. The plunger member 199 has a pair of cam projections 203 and 204 formed integrally on one of the lateral sides thereof and these projections are adapted to extend and project outwardly through a suitable axially extending slot formed in the lateral side of the bore 198. The projection 203 is adapted to cooperate with the roller 193 on the outer end of the link 181 and the projection 204 is adapted to cooperate with the roller 194 on the outer end of the link 190. It will be seen that the projections 203 and 204 are of such configuration that, as the plunger member moves rearwardly in the bore 198, the projection 204 will engage the roller 194 and cause a pivotal movement of the bracket 187 and consequent pivotal movement of the bell crank 170, thus actuating the operating rod 135. As the plunger moves forwardly, however, the link 194 will serve to depress the plunger 191 and to slip over this projection, causing no pivotal movement of the bracket 187. The converse is, however, true of the bracket 178 and it will be seen that this bracket is moved pivotally by forward movement of the plunger and the link 181 will slip over the projection 203 upon rearward movement of the plunger. It will be appreciated that movement of the plunger forwardly into the bore 198 is effected by the cam member 202 and resisted by the spring 200 and that rearward or outward movement of the plunger is effected by means of the spring 200. It will further be appreciated that, inasmuch as the cam member 202 is actuated and driven by the same shaft 111 which serves to cause pivotal movement of the upper welding arm 101, the cam member 202 is disposed upon this shaft in such a position that the cam will be disposed substantially in the position shown in Fig. 12, when the welding arm 101 is in raised position.

The plunger 199 is provided in its upper surface with a recess 206 which has a pivotally mounted trigger 207 adapted to cooperate therewith and it will be seen that the pivotally mounted trigger 207 is urged into engagement with the plunger by means of compression coil spring 208. The trigger member 207 has a projection 210 on the upper surface thereof which overlies the forward inclined end of a plunger 211. The outer end 212 of the plunger 211 is inclined to provide a cam surface which engages the projection 210 on the trigger member 207. It will consequently be appreciated that forward movement of the plunger 211 serves to withdraw the trigger member 207 from the recess 206 and permit outward or rearward movement of the primary plunger 199. The plunger 211 is normally urged forward by means of a compression coil spring 214 and is at times locked against forward movement by means of a vertically reciprocable plunger 216 which is urged downwardly into engagement with the plunger 211 by means of a compression coil spring 217. The plunger 216 is adapted to be retracted by means of a finger 220 pivotally connected to a pivotally mounted bracket 221, which bracket is actuated by means of a trip rod 222. It will be seen that the construction and arrangement of the trip member 220 is such that it will engage a recess in the side of the plunger 216 when moved in one direction, and effect a retraction of the plunger 216 in its housing, and will permit forward movement of the plunger after it has been retracted. The operating rod 222 is pivotally connected at its forward end to a bell crank arm 225, the central portion of which is pivotally connected to the lower welding arm 100 by means of a screw 228. The opposite end of the bell crank arm 225 is adapted to normally lie adjacent the electrodes on the outer ends of the welding arm 100 and lie in a plane substantially above the plane in which these electrodes are disposed so that a panel placed upon the lower welding arm 100 will serve to automatically depress the upper arm of the bell crank 225 and cause rearward movement of the operating rod 222. This rearward movement of the arm serves to cause an engagement of the catch. The operation of this mechanism is substantially as follows: When a sheet metal panel is placed upon the lower electrode in the welding arm 100, the upper arm of the bell crank 225 will be depressed, causing a rearward movement of the operating rod 222 associated therewith. Thus when the panel is removed the operating rod 222 will move forwardly and cause the pivotally mounted catch 220 to engage the recess in the side of the plunger 216 and raise this plunger. When the plunger 216 is raised, it will consequently release the plunger 211 and permit the same to move rearwardly in the direction it is urged by the compression coil spring 214. Due to the cam surface on the outer end 212 of this plunger 211, it will be seen that outward movement of the plunger serves to release the trigger 207 from the recess 206 of the plunger 199 and permit the plunger 199 to move outwardly in its housing 198. By reference to Fig. 11, it will be seen that outward movement of the plunger 199 serves to cause an engagement of the projection 204 with the link 190 pivotally connected to the bracket 187. As has been explained above, the engagement of this projection with the link 190 will cause a pivotal movement of the bell crank arm 170 and a consequent rearward movement of the operating rod 135. As has been explained in detail above, the forward end of the operating rod 135 is connected to the projection 136 on the quadrant section 137. Consequently, rearward movement of the operating rod 135 will serve first to move a nut and retainer through the duct 91 in position on the electromagnet 125.

After this nut and retainer have been moved to this position, the lug 146 will engage the arm 145 and cause a forward movement of the plunger 127 in its guideway moving the assembled nut and retainer outwardly in the channelway 124, and moving the assembled nut and retainer into welding position where the nut and retainer will be held by the catch 130. After the completion of this cycle of movement, it will be apparent that the parts will be restored to their original position under the urging of the compression coil spring 188. During the outward movement of the plunger member 199, it will be seen that the pivotally mounted link 181 will serve to depress the spring plunger 182 and permit this link to slip over the cam member 203. When the foot pedal 115 is depressed to effect a we'd of the nut and retainer to the sheet metal panel disposed between the electrodes, the shaft 111 will be rotated and the cam 202 thereon will serve to move the plunger 199 forwardly in its housing 198 and this forward movement will cause an engagement of the projection 203 with the link 181, causing a pivotal movement of the bracket 178 and a consequent pivotal movement of the bell crank arm 158, effecting a movement of the operating rod 80 which, as has been described above, serves to actuate the nut and retainer assembling mechanism. It will be seen that during forward movement of the plunger 199 the link 190 will slip over the projection 204 and effect no pivotal movement of either the bracket 187 or bell crank 170.

From the foregoing, it will be appreciated that when a sheet metal panel is placed between the electrodes, the plunger is retained withdrawn into its housing by means of the trigger 207. When the panel is placed between the electrodes, the bell crank arm 225 will be depressed but no actuation of the parts will take place. When the panel is moved from its position between the electrodes, the bell crank arm 225 will be released, releasing the plunger 199 and serving to move a nut outwardly in the channelway 124 into welding position. The depression of the operating pedal 115 serves to effect the welding of the assembled nut and retainer to the panel and simultaneously serves to actuate the mechanism for assembling a nut and retainer for use in connection with a future welding operation and drop the assembled nut and retainer down into the duct 91.

It will be appreciated from the foregoing that while but one embodiment of the present invention has been illustrated and described, many other and further modifications thereof, falling within the scope of the invention as defined in the subjoined claims, will be apparent to those skilled in the art.

I claim as my invention:

1. In a cage nut welding machine, welding electrodes for welding an assembled nut and retainer to a panel, and means responsive to the removal of said panel from one of said electrodes for automatically moving an assembled nut and retainer into position for a subsequent welding operation.

2. In a cage nut welding machine, welding electrodes for welding an assembled nut and retainer to a panel, means for urging said electrodes into engagement to effect said weld, and means actuated by said means for automatically assembling a nut and retainer for use in a subsequent welding operation.

3. In a cage nut welding machine, welding electrodes for welding an assembled nut and retainer to a panel, means responsive to the removal of said panel from one of said electrodes for automatically feeding an assembled nut and retainer into position for a subsequent welding operation, and means for automatically and positively retaining the nut and retainer thus fed in position for such subsequent welding operation.

4. In a cage nut welding machine, welding electrodes for welding an assembled nut and retainer to a panel, means for effecting engagement of said electrodes to effect such weld, means actuated by said means for assembling a nut and retainer for use in a subsequent welding operation, and means automatically operable upon removal of the panel from between said electrodes for moving an assembled nut and retainer into welding position.

5. In a cage nut welder, means for automatically arranging nuts and retainers in predetermined position with respect to each other, means for welding said assembled nuts and retainers to a sheet metal panel, and automatic means operable during said welding operation for automatically assembling a nut and retainer for use in a subsequent welding operation.

6. In a cage nut welder, including means for automatically assembling a nut within a retainer, means for serially feeding said assembled nuts and retainers to a point adjacent a pair of welding electrodes, and means for feeding an assembled nut and retainer into welding position on one of said electrodes, said last mentioned means being automatically operable upon removal of a member from one of said electrodes.

7. In a cage nut welder, including means for automatically assembling a nut within a retainer, means for serially feeding said assembled nuts and retainers to a point adjacent a pair of welding electrodes, means for feeding one of said assembled nuts and retainers into welding position on one of said electrodes, means for effecting engagement of said electrodes with the work to complete the weld, and means operable by said last mentioned means for automatically actuating said assembly mechanism.

8. In a cage nut welding machine a pair of electrodes for welding an assembled nut and retainer to a panel, a member adapted to be engaged by the placement of a panel on one of said electrodes, and means for feeding an assembled nut and retainer into position on one of said electrodes, release of said member serving to automatically effect the actuation of said feeding mechanism upon completion of a welding operation.

9. In a cage nut welding machine, a stationary electrode, a movable electrode, a rotatable member for effecting engagement of said movable electrode with said stationary electrode, means for automatically assembling a nut and retainer, means for automatically feeding a nut and retainer into welding position between said electrodes, and means actuated by said rotatable member for automatically actuating said assembly mechanism.

10. In a cage nut welder, a pair of electrodes adapted for engagement to weld an assembled nut and retainer to a panel, mechanism for feeding an assembled nut and retainer into position on one of said electrodes, a movable member adapted to be engaged and moved by the placement of a member to be welded upon one of said electrodes, and means connecting said member with said feeding mechanism serving to effect actuation of said feeding mechanism upon release of said member.

11. In a cage nut welder, a pair of electrodes adapted for engagement to weld an assembled nut and retainer to a panel, mechanism for feeding an assembled nut and retainer into position on one of said electrodes, a movable member adapted to be engaged and moved by the placement of a member to be welded upon one of said electrodes, means connecting said member with said feeding mechanism serving to effect actuation of said feeding mechanism upon release of said member, a rotatable member adapted to effect engagement of said electrodes, and means actuated by said rotatable member for effecting actuation of said assembly mechanism.

12. In a cage nut welder, a pair of relatively movable electrodes adapted for engagement to weld an assembled nut and retainer to a panel, a rotatable shaft for effecting engagement of said electrodes, a cam on said shaft, a plunger adapted to be engaged by said cam and depressed thereby, means for assembling a nut and retainer for use in a subsequent welding operation, and means actuated by movement of said plunger for effecting actuation of said assembly mechanism whereby said assembly mechanism is actuated automatically as said welding electrodes are urged into engagement with the work.

13. A cage nut welder, including a pair of relatively movable electrodes adapted for welding an assembled nut and retainer to a panel, means for urging said electrodes into engagement with said work, a movable member pivotally mounted adjacent said electrodes adapted to be depressed by the insertion of a panel between said electrodes, a reciprocable plunger adapted to be depressed upon the actuation of said electrodes to complete a welding operation, means interconnecting said movable member adjacent said electrodes with said plunger for releasing said plunger upon the removal of work from between said electrodes, mechanism for automatically feeding an assembled nut and retainer into position on one of said electrodes, and means interconnecting said feeding mechanism and plunger for automatically actuating the former upon release of the latter.

14. In a cage nut welder, a pair of welding electrodes adapted to engage and weld an assembled nut and retainer to a sheet metal panel, means for automatically assembling nuts and retainers for use in subsequent welding operations, means for automatically feeding an assembled nut and retainer into welding position on one of said electrodes, a rotatable shaft for effecting engagement of said electrodes to weld an assembled nut and retainer to a panel, a reciprocable plunger, means carried by said rotatable member for effecting movement of said plunger in one direction, and means carried by said plunger serving to actuate said assembly mechanism as said plunger is moved by said rotatable member.

15. In a cage nut welder, a pair of welding electrodes adapted to engage and weld an assembled nut and retainer to a sheet metal panel, means for automatically assembling nuts and retainers for use in subsequent welding operations, means for automatically feeding an assembled nut and retainer into welding position on one of said electrodes, a rotatable shaft for effecting engagement of said electrodes to weld an assembled nut and retainer to a panel, a reciprocable plunger, means carried by said rotatable member for effecting movement of said plunger in one direction, means carried by said plunger serving to actuate said assembly mechanism as said plunger is moved by said rotatable member, and means actuated by the movement of said plunger in the opposite direction for automatically actuating said nut and retainer feed mechanism.

16. In a cage nut welder, a pair of welding electrodes adapted to engage and weld an assembled nut and retainer to a sheet metal panel, means for automatically assembling nuts and retainers for use in subsequent welding operations, means for automatically feeding an assembled nut and retainer into welding position on one of said electrodes, a rotatable shaft for effecting engagement of said electrodes to weld an assembled nut and retainer to a panel, a reciprocable plunger, means for latching said plunger against such movement, means carried by said plunger serving to actuate said assembly mechanism as said plunger is moved by said rotatable member, means actuated by the movement of said plunger in the opposite direction for automatically actuating said nut and retainer feed mechanism, a member mounted adjacent said electrodes adapted to be depressed by the insertion of work to be done, and means interconnecting said member with said plunger whereby removal of said work serves to release said plunger and permit movement thereof in the opposite direction.

17. In a cage nut welder, means for arranging nut retainers in position, an automatic assembly mechanism, means for feeding said retainers from said arranging means to said assembly mechanism, the while retaining said retainers in predetermined position, means for feeding nuts to said assembly mechanism and a conduit for conducting said assembled nuts and retainers to a point adjacent one of the electrodes of said welder the while retaining the same in assembled relation.

18. In a cage nut welding machine, welding electrodes for welding an assembled nut and retainer to a panel, means for assembling a nut within a nut retainer, means for moving said electrodes toward each other to effect a weld, means actuated upon movement of said electrodes serving to automatically actuate said assembly means, and continuously operated means for supplying nuts and retainers in predetermined position to said assembly mechanism.

HOWARD W. WILKINS.